(12) United States Patent
Gentry

(10) Patent No.: US 8,690,191 B2
(45) Date of Patent: Apr. 8, 2014

(54) REFUSE VEHICLE INCLUDING A CNG TANK COMPARTMENT

(75) Inventor: David C. Gentry, Chattanooga, TN (US)

(73) Assignee: The Heil Co., Chattanooga, TN (US)

( * ) Notice: Subject to any disclaimer, the term of this patent is extended or adjusted under 35 U.S.C. 154(b) by 151 days.

(21) Appl. No.: 13/454,444

(22) Filed: Apr. 24, 2012

(65) Prior Publication Data

US 2012/0280481 A1 Nov. 8, 2012

Related U.S. Application Data

(60) Provisional application No. 61/483,201, filed on May 6, 2011.

(51) Int. Cl.
*B60K 15/03* (2006.01)

(52) U.S. Cl.
USPC .................................................... 280/834

(58) Field of Classification Search
USPC .......... 280/831, 834, 836; 180/69.4; 220/562, 220/564
See application file for complete search history.

(56) References Cited

U.S. PATENT DOCUMENTS

| | | |
|---|---|---|
| 2,574,177 A | 11/1951 | Godet |
| 2,895,560 A | 7/1959 | Lynn |
| 3,565,201 A | 2/1971 | Petsinger |
| 5,330,031 A | 7/1994 | Hill et al. |
| 5,549,096 A | 8/1996 | Swenson et al. |
| 6,257,360 B1 | 7/2001 | Wozniak et al. |
| 6,279,612 B1 | 8/2001 | Warth |
| 6,367,573 B1 | 4/2002 | Scott |
| 6,412,588 B1 | 7/2002 | Scott et al. |
| 6,418,962 B1 | 7/2002 | Wozniak et al. |
| 6,439,334 B1 | 8/2002 | Myers et al. |
| 6,481,751 B1 | 11/2002 | Davis, Jr. et al. |
| 6,502,660 B1 | 1/2003 | Scott et al. |
| 6,527,075 B1 | 3/2003 | Izuchukwu et al. |
| 7,270,209 B2 | 9/2007 | Suess |
| 7,543,667 B2 | 6/2009 | Hwang et al. |
| 7,624,753 B2 | 12/2009 | Suess et al. |
| 7,882,587 B2 | 2/2011 | Tagliaferri |
| 2010/0078244 A1 | 4/2010 | Pursifull |

FOREIGN PATENT DOCUMENTS

JP 2008-137643 6/2008

*Primary Examiner* — Tony Winner
(74) *Attorney, Agent, or Firm* — Harness, Dickey & Pierce, P.L.C.

(57) ABSTRACT

A refuse collection vehicle has a receiving area in a refuse collection device. The receiving area includes a body cradle to receive at least one CNG tank. At least one CNG tank is positioned in the body cradle. At least one door covers the receiving area. The at least one door is pivotally secured on the refuse collection device to enable access to the at least one CNG tank without use of external lift device.

14 Claims, 9 Drawing Sheets

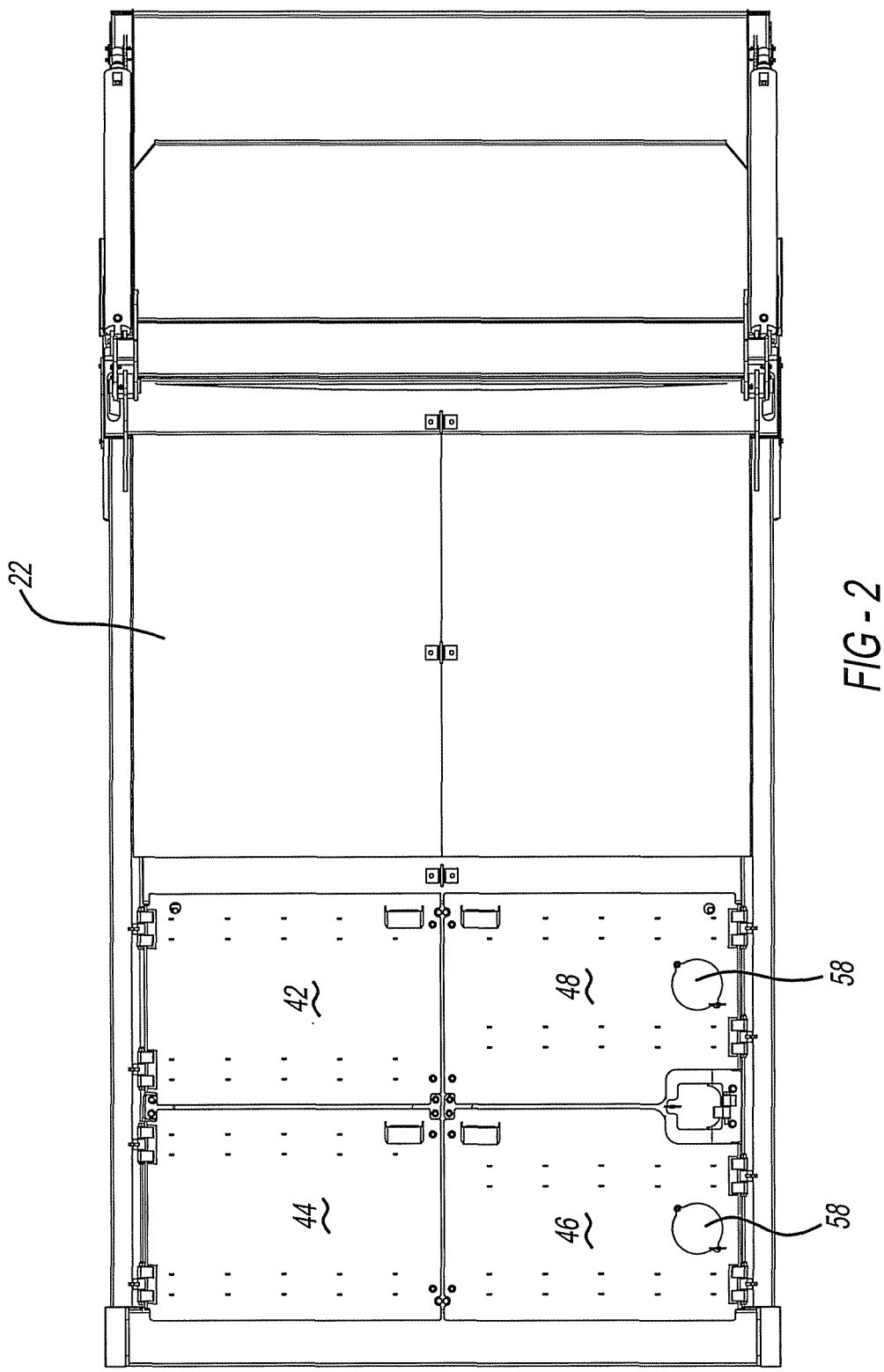

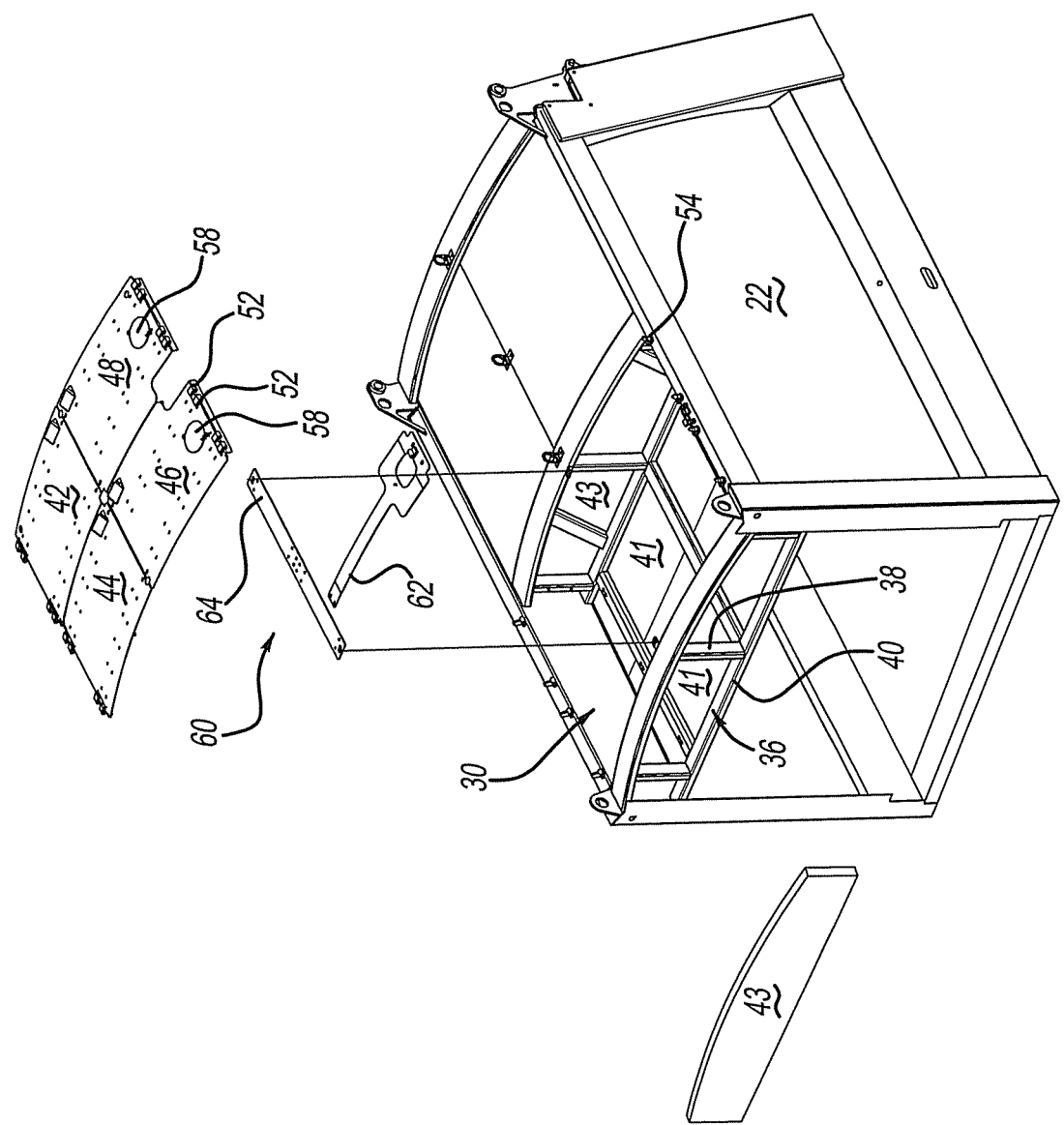

REFUSE VEHICLE INCLUDING A CNG TANK COMPARTMENT

CROSS-REFERENCE TO RELATED APPLICATIONS

Figure 1:
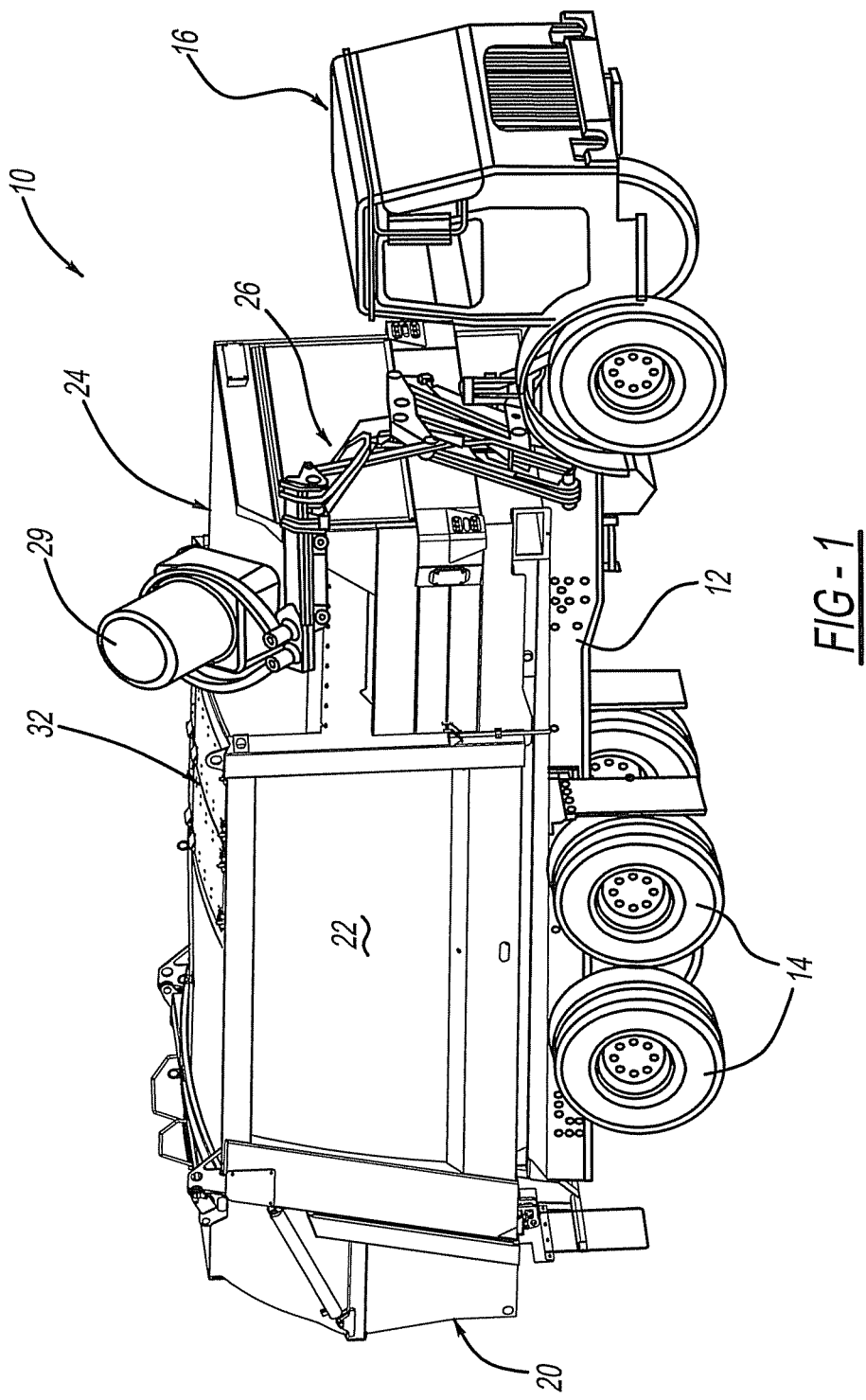

This application claims the benefit of U.S. Provisional Application No. 61/483,201, filed on May 6, 2011. The entire disclosure of the above application is incorporated herein by reference.

FIELD

The present disclosure relates to a refuse collection vehicle and, more particularly, to a refuse collection vehicle that includes a compartment for CNG tanks.

BACKGROUND

Refuse collecting vehicles have been around for numerous years. They have been powered by gasoline, diesel and compressed natural gas (CNG) fuels. With the uncertainty and rising costs of gasoline and diesel, as well as the stabilization in manufacturing CNG, it is becoming more desirable to outfit refuse collection vehicles with CNG to run internal combustion engines. However, due to the size of the refuse collection vehicles, a large storage area is required to retain the CNG tanks.

In refuse vehicles that include CNG tanks, federal regulations require that the tanks must be visually inspected at least monthly. Thus, this necessitates the removable of a panel to enable access to the tanks. One type of system utilizes a single panel door that requires a hoist or lift to remove the door to uncover the CNG tanks. Thus, the type of vehicle necessitates the vehicle to be moved to a garage or the like to enable the door or panel to be removed from the refuse vehicle container. Thus, this limits ready inspection of the CNG tanks.

SUMMARY

Accordingly, it is an object of the disclosure to provide a compartment in a refuse collection vehicle that enables ready inspection of CNG tanks inside of the compartment. The present disclosure provides access doors that enable access to emergency shut-offs of the CNG tanks. The present disclosure provides ready removal of the door above the CNG tanks for easy inspection. Additionally, the present disclosure enables the door to be manipulated by the inspector with minimal effort. Also, the present disclosure provides a door that remains on the refuse collection vehicle.

According to the present disclosure, a refuse collection vehicle comprises a vehicle body and a refuse collection device. A receiving area is present in the refuse collection device. The receiving area includes a body cradle to receive at least one CNG tank. At least one CNG tank is positioned in the body cradle. At least one door covers the receiving area. The at least one door is secured with the refuse collection device to enable ready access to the at least one CNG tank. The door includes at least one access cover to enable access to a shut-off of the CNG tank. Further, a plurality of CNG tanks are positioned in a tank cradle and loaded into the body cradle in the receiving area. A plurality of doors are pivotally secured to the refuse collection device to enable ready access to the at least one tank. A reinforcement structure supports the plurality of doors and is positioned over the receiving area. The plurality of doors is secured with the reinforcement structure by a small number of fasteners in a closed position.

According to a second aspect of the disclosure, a compartment on a refuse collection device comprises a receiving area in the refuse collection device. The receiving area includes a body cradle to receive at least one CNG tank. At least one CNG tank is positioned in the body cradle. At least one door covers the receiving area. The at least one door is secured with the refuse collection device to enable ready access to the at least one CNG tank. The door includes at least one access cover to enable access to a shut-off of the CNG tank. Further, a plurality of CNG tanks are positioned in a second cradle and loaded into the body cradle in the receiving area. A plurality of doors are pivotally secured to the refuse collection device to enable ready access to the at least one CNG tank. A reinforcement structure supports the plurality of doors and is positioned over the receiving area. The plurality of doors is secured with the reinforcement structure by a small number of fasteners in a closed position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3A:
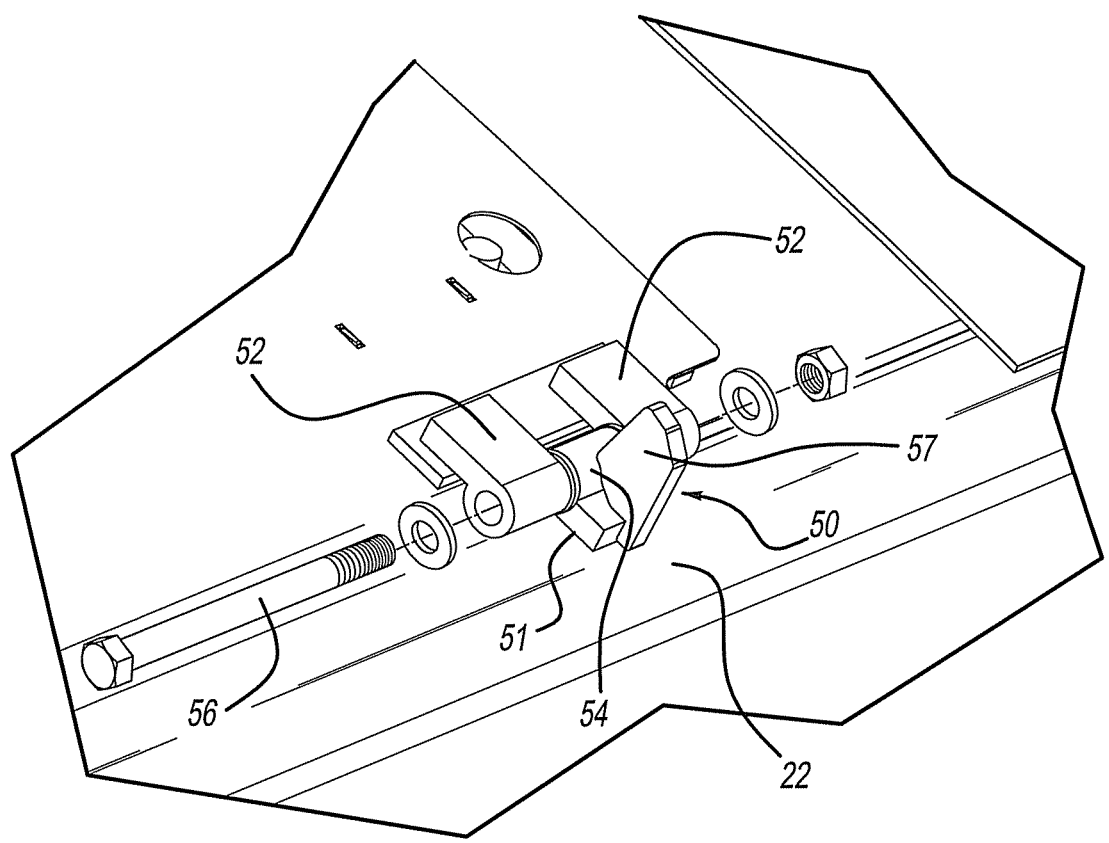
Figure 4:
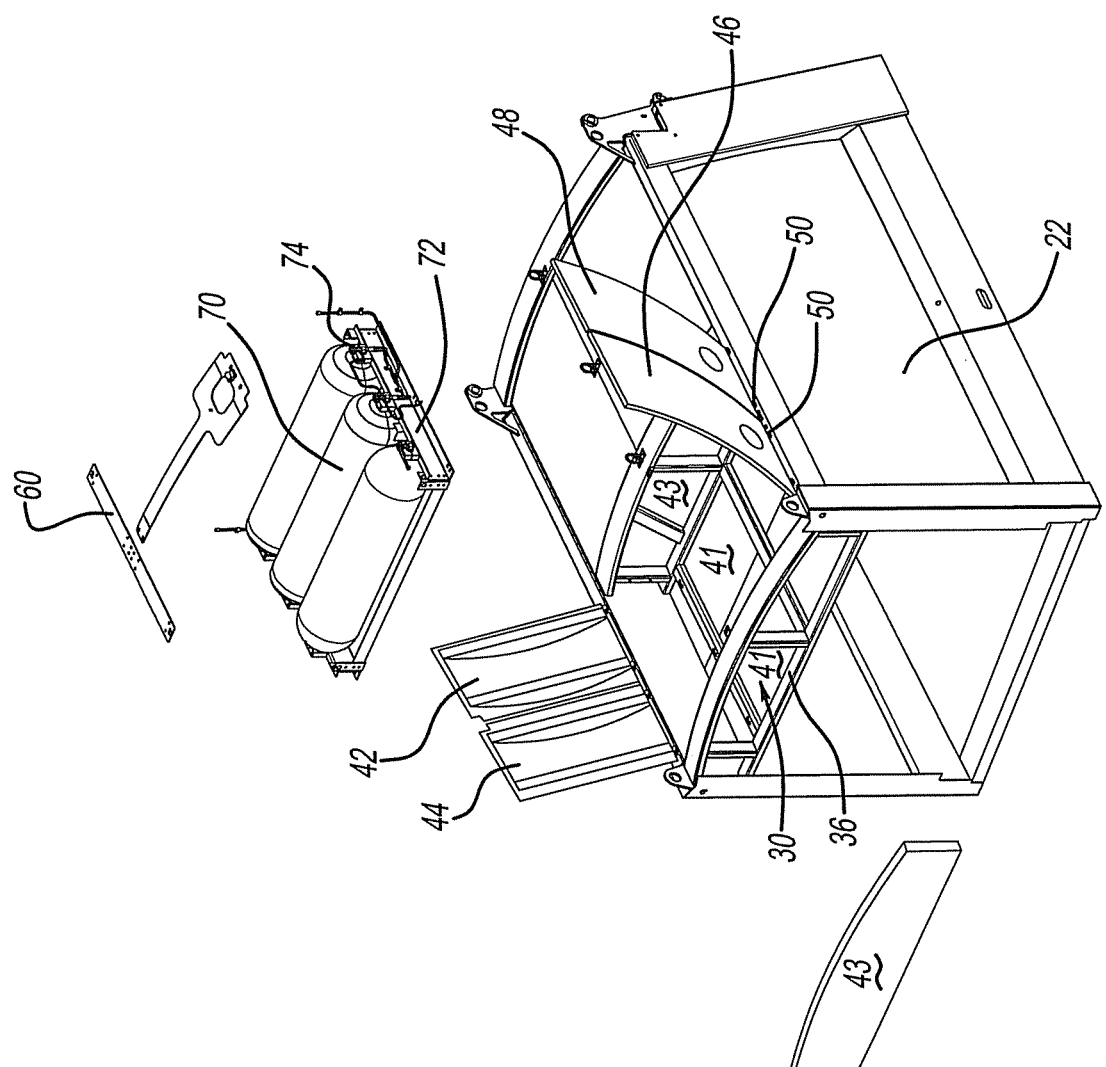
Figure 5:
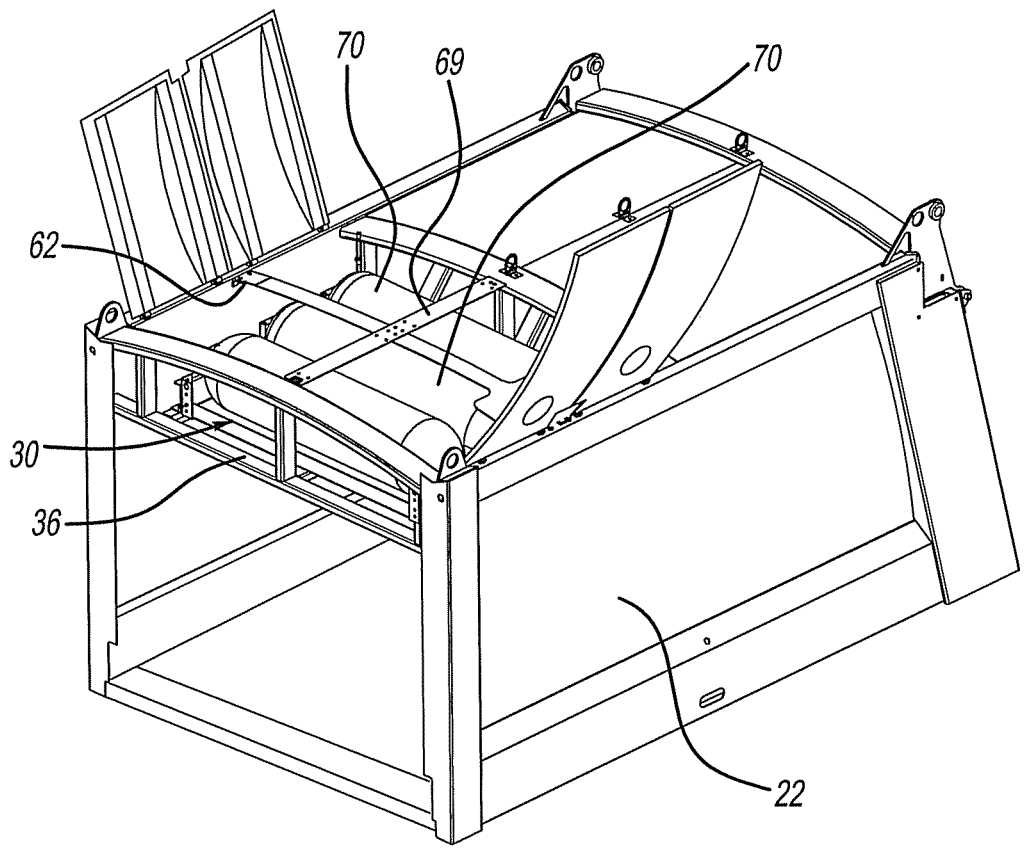
Figure 6:
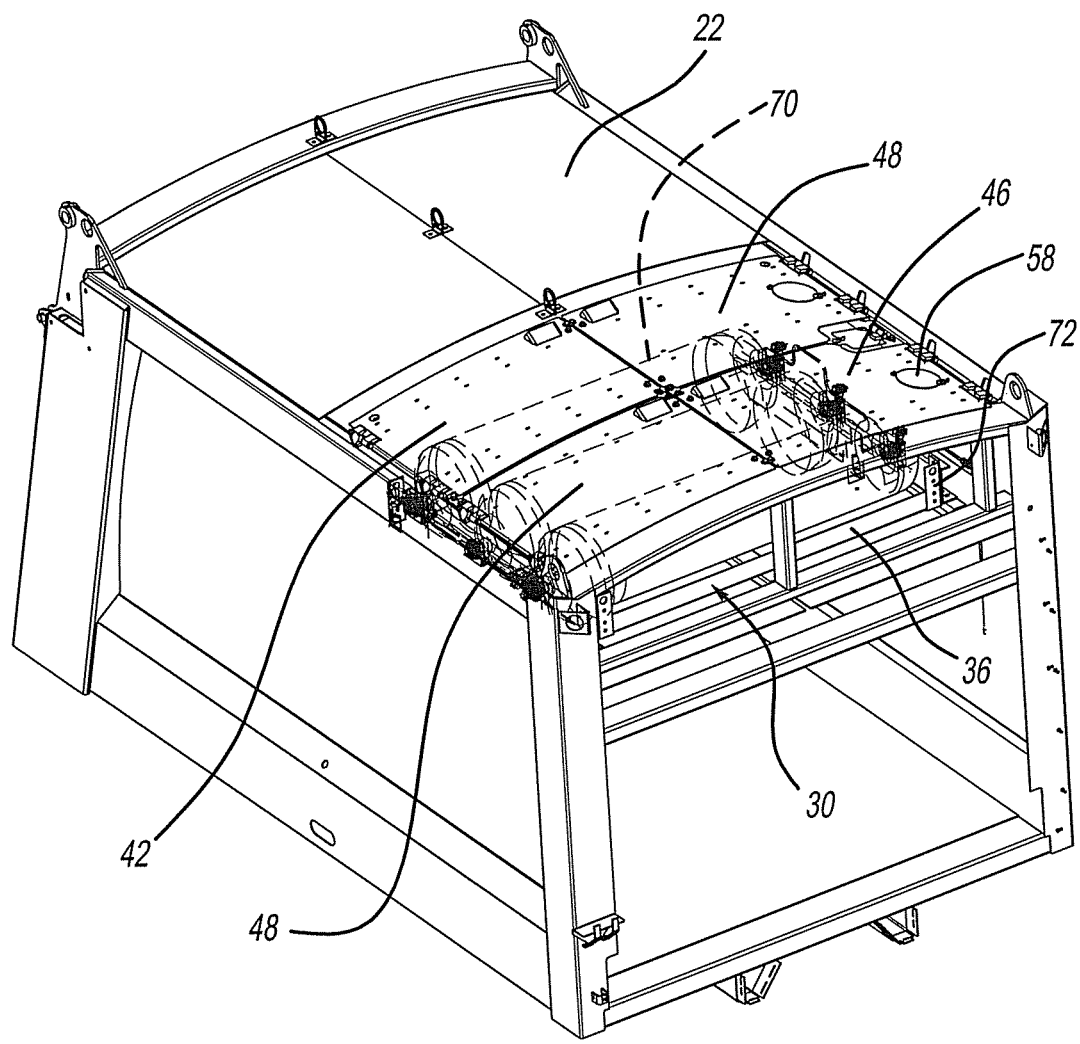
Figure 7:
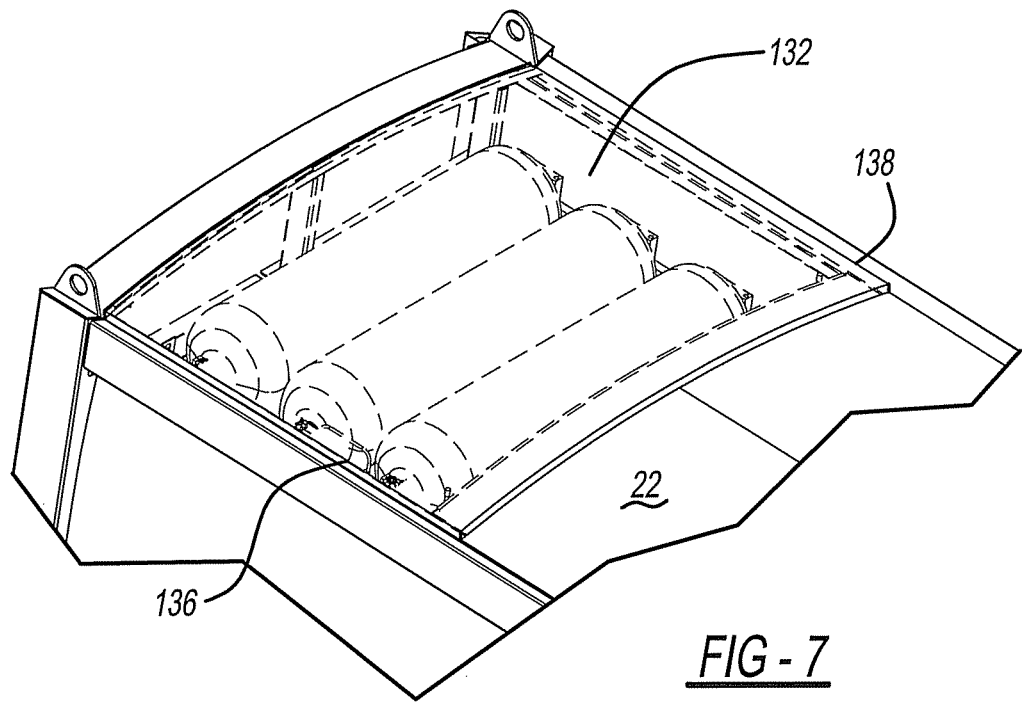
Figure 8:
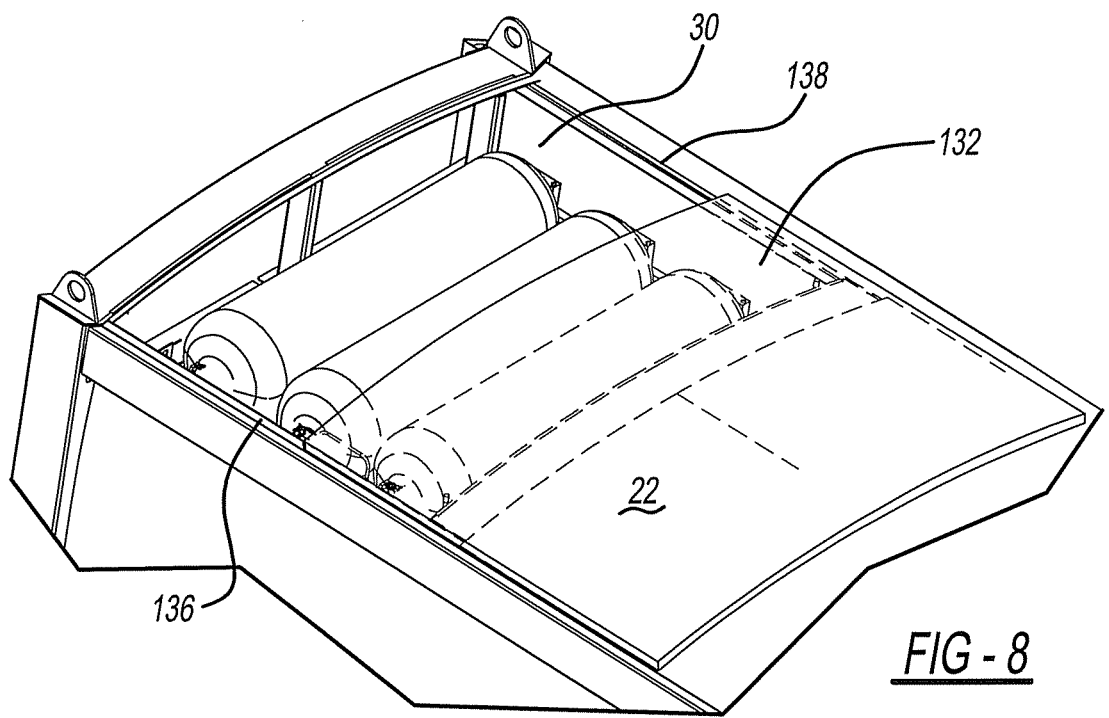
Figure 9:
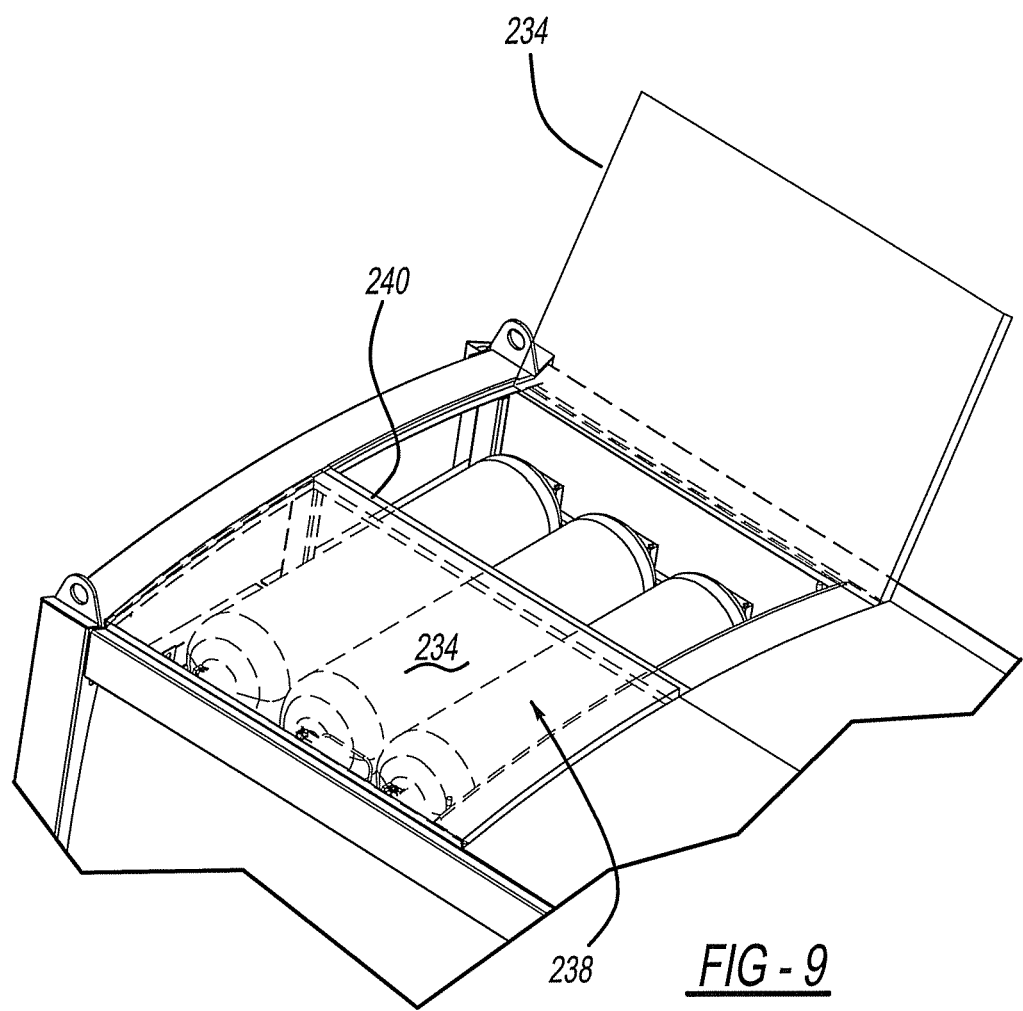

FIG. 1 is an elevation view of a refuse collection vehicle.
FIG. 2 is a top plan view of the collection body of FIG. 1.
FIG. 3 is an exploded view of FIG. 2.
FIG. 3(a) is an exploded view of the pivot mechanism.
FIG. 4 is a partial exploded view like FIG. 3 loading the CNG tanks.
FIG. 5 is a perspective view like FIG. 4 with the CNG tanks loaded with doors in an opened position.
FIG. 6 is a perspective view like FIG. 5 with the CNG tanks loaded and the doors in a closed position.
FIG. 7 is a partial perspective view of a second embodiment of the present disclosure.
FIG. 8 is a view like FIG. 7 with the door in an open position.
FIG. 9 is a partial perspective view of an additional embodiment of the present disclosure.

DETAILED DESCRIPTION

Turning to the figures, a refuse collection vehicle is illustrated and designated with the reference numeral 10. The refuse collection vehicle 10 includes a frame 12, supported by wheels 14, a cab 16 and an internal combustion engine (not shown) that runs on CNG fuel. The cab 16 also includes a steering wheel, brakes, etc. to drive the vehicle. A refuse collection device 20 is positioned onto the frame 12. The refuse collection device 20 includes a body 22, a hopper 24 and an arm 26. The arm 26 grasps refuse containers 29 and dumps the refuse container into the hopper 24. The hopper 24 also includes a ram (not shown) that pushes the refuse into the body 22. The body 22 includes a compartment 30 to store CNG tanks. The compartment 30 is covered by a door mechanism 32. Compartment 30 is separated from the refuse by steel plates 41, 43 welded to supports 40 so as not to allow refuse from entering compartment 30.

Turning to FIG. 3, the compartment 30 is illustrated. The compartment 30 includes a receiving area that is formed by a body cradle 36. The body cradle 36 includes support members 38, 40. The support members 38 are welded with the container 22 to provide vertical support of the body cradle 36. The plates 41, 43 are welded to support member 38 and 40. The support members 40 are horizontally positioned and connected to the support members 38 to support the CNG tanks. Thus, the compartment 30 is positioned over top of the refuse receiving area of the container 22 to enable refuse to pass underneath the CNG tanks.

The door mechanism 32 includes a plurality of doors 42-48. Each door 42-48 includes a pivotal mechanism 50. Preferably, it includes a pair of extending pivot mechanisms 50. The pivot mechanism 50 includes a pair of hinge barrels 52 extending from the doors 42-48. A second member 51 including a hinge barrel 54 extends from the collection body 22. All of the hinge barrels 52, 54 include a bore to receive a hinge pin or fastener 56. Additionally, the second member 51 includes a stop 57 that prohibits further opening of the doors (42-48) as illustrated in FIGS. 4 and 5. The hinge pin or fastener 56 is passed through the hinge barrels 52, 54 and a nut is secured to the fastener to keep the pivot mechanism 50 in place. Thus, this enables the doors 42-48 to pivot on the container 22, as illustrated in FIGS. 4, 5 and 6. Two of the doors 46, 48 include an access cover 58 that enables access to the CNG tanks. The cover 58 may be of any design. This enables the user to access the shut offs of the CNG tanks within the compartment 30. Ordinarily, the doors 42-48 include an overall rectangular shape with a curved contour to be positioned onto the container 22 to follow the contour of the top of the body 22.

A reinforcement structure 60 is positioned over the top of the compartment 30 to support the doors 42-48. The reinforcement structure 60 includes a lateral beam 62 and a longitudinal beam 64. These beams 62, 64 are connected to one another and to the container 22 after the CNG tanks are positioned into the compartment 30. Additionally, the doors 42-48 are fastened to the reinforcement structure 60 to hold the doors 42-48 in a closed position. Also, a small number of fasteners, such as 2 to 4, are easily removable to enable ready access into the compartment 30 for examination of the CNG tanks. Usually, two fasteners are utilized on each door 42-48 to retain the doors 42-48 onto the support structure 60.

The CNG tanks 70 are held in a tank cradle 72. The tanks 70 are positioned into the tank cradle 72 and secured with the tank cradle 72 prior to placement into the compartment 30. Thus, once the cradle 72 and CNG tanks 70 are assembled together, the assembly can be lifted and positioned into the compartment body cradle 36 inside of the container 22. The tank cradle 72 has an overall rectangular configuration including a plurality of supports 74 to enable securement of the CNG tanks 70 with the tank cradle.

The CNG tank assembly with the tanks 70 and cradle 72 is loaded into the compartment 30 as illustrated in FIGS. 4 and 5. Once the tank cradle 72 has been positioned onto the body cradle 36 and the compartment 30, the tank cradle 72 is secured to the beams 40 with fasteners. A fastener can be passed through reinforcement structure 60 positioned and secured with the body 22, to span the opening of the compartment 30. The reinforcement structure 60 provides the additional function of supporting the doors 42-48 after the doors are closed on top of the reinforcement structure 60. The doors 42-48 are then fastened into the reinforcement structure 60 as illustrated in FIGS. 2 and 6.

Thus, once they have been secured, the doors 42-48 are maintained in position during use of the refuse collection vehicle. When it is necessary to view the CNG tanks 70, the inspector climbs onto the roof of the container 22, readily removes the two fasteners holding each door 42-48 and inspects the CNG tanks 70. The doors 42-44 are easily pivoted on the container 22 and remain on the container 22 during inspection as illustrated in FIG. 5. Thus, this enables the tanks to be inspected without removing the cover by a hoist, lift or the like. Additionally, the body cradle 36 accepts the CNG tank cradle 72. The body cradle 36 separates the refuse collection portion of the container 22 from the CNG tanks 70. Additionally, the body cradle 36 enables excess water, such as rain, from collecting where the CNG tanks 70 are stored.

Turning to FIGS. 7-9, additional embodiments of the present disclosure are illustrated. In these embodiments, the embodiments are the same but for the doors covering the compartment.

In FIGS. 7 and 8, a sliding door mechanism 132 is illustrated. The sliding door mechanism 132 includes a door 134 and a pair of rails 136, 138. The door 134 slides in the rails 136, 138 as illustrated in FIGS. 7 and 8 from an open to a closed position. The operation of the door can be achieved in a variety of methods including manual power, hydraulic power, pnuematic power, electric power and the like. In the open position, the CNG tanks 70 are exposed to enable viewing by an inspector. Additionally, if necessary, the door 134 can be fastened to the body 22 in a closed position.

Turning to FIG. 9, an additional embodiment is illustrated. Here, the embodiment includes a door mechanism 232 covering the compartment 30. Here, two doors 234 are utilized to cover the compartment 30. The doors may be pivotally connected to the body 22 as in the first embodiment. Additionally, a support structure 240 may be utilized to fasten the doors 234 to the support structure 240 as in the first embodiment.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:

1. A refuse collection vehicle comprising:
a vehicle including a frame and a refuse collection device;
a receiving area is in the refuse collection device, the receiving area includes a body cradle to receive at least one CNG tank;
the at least one CNG tank is positioned in the cradle; and
at least one door covering the receiving area, the at least one door retained on the refuse collection device, during inspection, to enable access to the at least one CNG tank.

2. The refuse collection vehicle of claim 1, further comprising an access cover enabling access to a shut off on the at least one CNG tank.

3. The refuse collection vehicle of claim 1, wherein the at least one CGN tank further comprising a plurality of CNG tanks positioned in a tank cradle and secured to the body cradle in the receiving area.

4. The refuse collection vehicle of claim 1, wherein the at least one door further comprising a plurality of doors pivotally secured to the refuse collection device to enable access to the at least one CNG tank.

5. The refuse collection vehicle of claim 4, further comprising a reinforcement structure for supporting the plurality of doors over the at least one CNG tank.

6. The refuse collection vehicle of claim 5, wherein each of the plurality of doors is secured with the reinforcement structure by a small number of fasteners.

7. The refuse collection vehicle of claim 1, wherein the at least one door slides on the body.

8. A compartment on a refuse collection device comprising:

a receiving area in the collection device, the receiving area including a body cradle to receive at least one CNG tank;

the at least one CNG tank positioned in the body cradle; and at least one door covering the receiving area, the at least one door retained on the refuse collection device, during inspection, to enable access to the at least one CNG tank.

9. The compartment of claim 8, further comprising an access cover enabling access to a shut off on the at least one CNG tank.

10. The compartment of claim 8, wherein the at least one door further comprising a plurality of doors pivotally secured to the refuse collection device to enable access to the at least one CNG tank.

11. The compartment of claim 10, further comprising a reinforcement structure for supporting the plurality of doors over the at least one CNG tank.

12. The refuse collection vehicle of claim 5, wherein each of the plurality of doors is secured with the reinforcement structure by a small number of fasteners.

13. The compartment of claim 8, wherein the at least one CGN tank further comprising a plurality of CNG tanks positioned in a tank cradle and secured to the body cradle in the receiving area.

14. The compartment of claim 8, wherein the at least one door slides on the body.

* * * * *